G. A. LUTZ & C. C. SIBLEY.
RECEPTACLE OR THE LIKE FOR CONDUITS.
APPLICATION FILED MAR. 5, 1909.
941,156.
Patented Nov. 23, 1909.
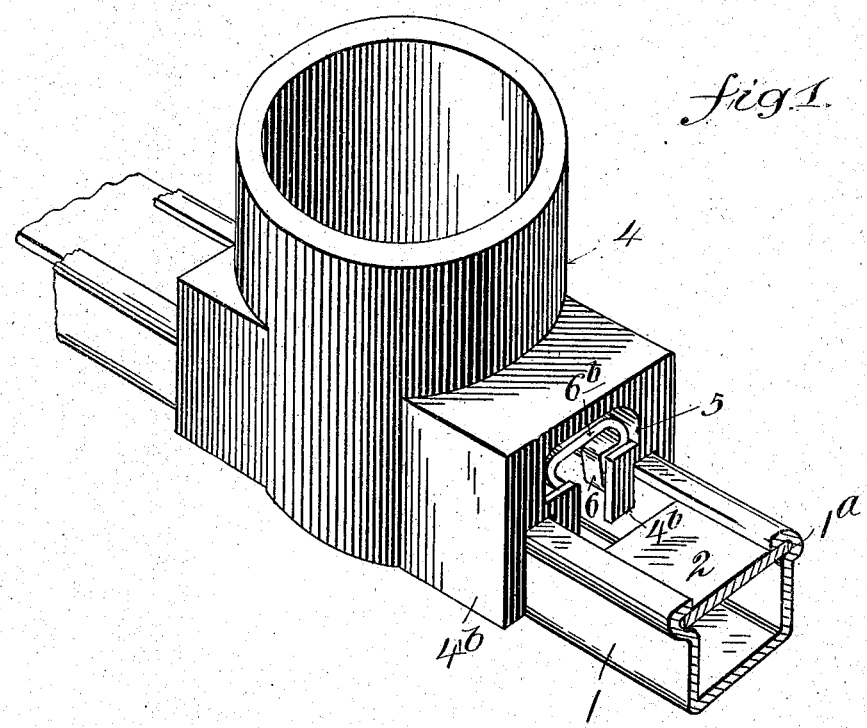
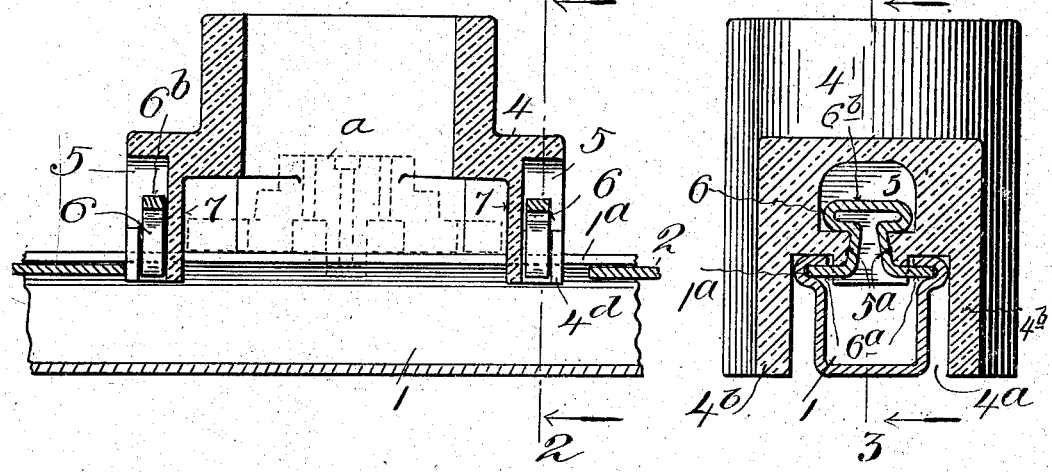
Witnesses:
Inventors
G. A. Lutz & C. C. Sibley

UNITED STATES PATENT OFFICE.

GEORGE A. LUTZ, OF PLAINFIELD, AND CLARENCE C. SIBLEY, OF PERTH AMBOY, NEW JERSEY.

RECEPTACLE OR THE LIKE FOR CONDUITS.

941,156.  Specification of Letters Patent.  Patented Nov. 23, 1909.

Original application filed October 26, 1905, Serial No. 284,559. Divided and this application filed March 5, 1909. Serial No. 481,412.

To all whom it may concern:

Be it known that we, GEORGE A. LUTZ and CLARENCE C. SIBLEY, citizens of the United States, and residents of Plainfield, Union county, New Jersey, and Perth Amboy, Middlesex county, New Jersey, respectively, have invented certain new and useful Improvements in Receptacles or the Like for Conduits, of which the following is a specification.

This application is a division of our joint application for patent on receptacle or the like for conduits, filed October 26, 1905, Serial No. 284,559.

The object of this invention is to provide simple and efficient means for detachably supporting receptacles, rosettes and similar devices in connection with conduits for electric conductors.

The invention comprises the novel details of improvement and arrangements of parts that will be more fully hereinafter set forth and then pointed out in the claims.

Reference is to be had to the accompanying drawings forming part hereof, wherein, Figure 1 is a perspective view showing a receptacle mounted upon a conduit in accordance with this invention; Fig. 2 is a cross section on the line 2, 2, in Fig. 3; and Fig. 3 is a section substantially on the line 3, 3, in Fig. 2.

Similar characters of reference indicate corresponding parts in the several views.

The numeral 1 indicates a conduit of the class having one side open and provided with a removable cover 2; in the example illustrated the conduit is shown provided with grooved portions or projections 1ᵃ receiving the cover 2. The receptacle or the like that is mounted upon the conduit is shown in the form of a cap 4, which generally may be of well known construction, adapted to contain a base $a$ for suitable electric fittings, such as for making connection with lamp sockets and the like. The receptacle or cap 4 is provided with a gain or recess 4ᵃ opening through the bottom and opposite ends thereof, so that the side members 4ᵇ of the cap may straddle the conduit while the cap incloses the adjacent portions of the conduit as well as the interior fittings. The cap 4 at its ends is provided with a recess 5 in which are fitted spring-like locking pieces 6 having extended portions 6ᵃ adapted to engage the conduit as by entering the grooves 1ᵃ thereof, the locking pieces 6 being shown substantially in the form of cotter pins having their end portions 6ᵃ bent outwardly. As shown, the walls 5ᵃ of the recess 5 diverge outwardly, as in Fig. 2, so that to conveniently remove the locking pieces 6 a tool may be inserted in their looplike head portions 6ᵇ to lift the same, whereby their extensions 6ᵃ will be drawn out of the grooves 1ᵃ. To attach the cap to the conduit the cap is first placed over the conduit, the locking pieces 6 are pinched and passed into the recesses 5, and then allowed to spring outwardly, the ends 6ᵃ then engaging the conduit and holding the cap thereon, (see Fig. 2). The cap 4 at its ends is shown provided with lugs 4ᵈ that project into the conduit 1 in line with covers 2 and limit the forward movement of the cap therewith or into the cap. The cap may be made of insulating material, such as porcelain, and as the locking pieces 6 may be made of metal, said locking pieces are protected by being within the recesses 5. The inner walls 7 at the recesses 5 close the ends of the cap at such places, and further protect the locking pieces 6 from danger of short circuiting.

While we have shown our improvements as applied to the cap 4 as a member of a receptacle for electric fixtures, it will be understood that the same may be used in connection with rosettes and other analogous devices to be detachably connected with or mounted upon conduits generally, and this invention is not limited to the details of construction and arrangements of parts shown and described.

Having now described our invention what we claim is:—

1. The combination of a conduit, with a fitting thereon provided with a locking piece having independently movable portions to engage opposite parts of the conduit.

2. The combination of a conduit, with a fitting thereon provided with a spring-like piece engaging opposite parts of the conduit to hold the fitting thereto.

3. The combination of a conduit, with a fitting provided with a spring-like locking piece having extended portions engaging the conduit.

4. The combination of a conduit, with a fitting provided with a recess, and a locking piece removably held in the recess and having extended portions engaging the conduit.

5. The combination of a conduit, with a fitting provided with a recess and a spring-like locking piece located in said recess and having extended portions engaging the conduit.

6. The combination of a conduit, with a fitting having a recess that opens outwardly at the end of the fitting, and a wall at the inner side of the recess, and a locking piece fitted in said recess and engaging the conduit.

7. The combination of a conduit, with a fitting provided with a recess, and a spring-like locking piece in said recess provided with a head portion, depending portions, and outwardly extending portions engaging the conduit.

8. The combination of a conduit, with a fitting having a gain and provided with a recess opening into said gain, and a locking piece fitted in said recess and provided with extended portions engaging the conduit.

9. A fitting for electric appliances provided with a recess, and a spring-like locking piece fitted in said recess and provided with extended portions to engage the conduit.

10. A fitting for electric appliances provided with a gain and having a recess opening into the gain, and a locking piece removably fitted in said recess and having extended portions to engage a conduit.

11. A fitting for electric appliances provided with a recess having a reduced portion at the lower part and a locking piece having parts in said reduced portion and having extended end portions.

12. A fitting for electric appliances provided with a recess having a reduced portion provided with diverging walls, and a locking piece having a head portion in said recess, parts extending along said diverging walls and extended portions to engage a conduit.

Signed at New York city, in the county of New York, and State of New York this 16th day of February, A. D. 1909.

GEORGE A. LUTZ.
CLARENCE C. SIBLEY.

Witnesses as to signature of G. A. Lutz:
RALPH K. RAPHAEL,
T. F. BOURNE.

Witnesses as to signature of C. C. Sibley:
T. F. BOURNE,
GEORGE D. PITMAN.